United States Patent
Grosz et al.

(10) Patent No.: US 6,799,194 B2
(45) Date of Patent: Sep. 28, 2004

(54) PROCESSING APPARATUS FOR PERFORMING PRECONDITIONING PROCESS THROUGH MULTILEVEL BLOCK INCOMPLETE FACTORIZATION

(75) Inventors: Lutz Grosz, Kaukapakapa (NZ); Makoto Nakanishi, Kawasaki (JP)

(73) Assignees: Fujitsu Limited, Kawasaki (JP); Australian National University, Canberra (AU)

( * ) Notice: Subject to any disclaimer, the term of this patent is extended or adjusted under 35 U.S.C. 154(b) by 625 days.

(21) Appl. No.: 09/891,203

(22) Filed: Jun. 26, 2001

(65) Prior Publication Data

US 2002/0099748 A1 Jul. 25, 2002

(30) Foreign Application Priority Data

Nov. 21, 2000 (JP) ........................................ 2000-354179

(51) Int. Cl.$^7$ .............................................. G06F 17/12
(52) U.S. Cl. ................ 708/446; 703/2; 712/10
(58) Field of Search .............................. 708/446; 703/2; 712/10

(56) References Cited

U.S. PATENT DOCUMENTS

| | | | | |
|---|---|---|---|---|
| 5,604,911 A | * | 2/1997 | Ushiro | 703/2 |
| 6,144,932 A | * | 11/2000 | Hachiya | 703/14 |
| 6,360,190 B1 | * | 3/2002 | Kumashiro | 703/2 |
| 2002/0091909 A1 | * | 7/2002 | Nakanishi | 712/10 |

* cited by examiner

Primary Examiner—David H. Malzahn
(74) Attorney, Agent, or Firm—Staas & Halsey LLP

(57) ABSTRACT

In a preconditioning process for an iteration method to solve simultaneous linear equations through multilevel block incomplete factorization of a coefficient matrix, a set of variable numbers of variables to be removed is determined at each level of the factorization such that a block matrix comprising coefficients of the variables can be diagonal dominant. The approximate inverse matrix of the block matrix is obtained in iterative computation, and non-zero elements of a coefficient matrix at a coarse level are reduced.

8 Claims, 11 Drawing Sheets

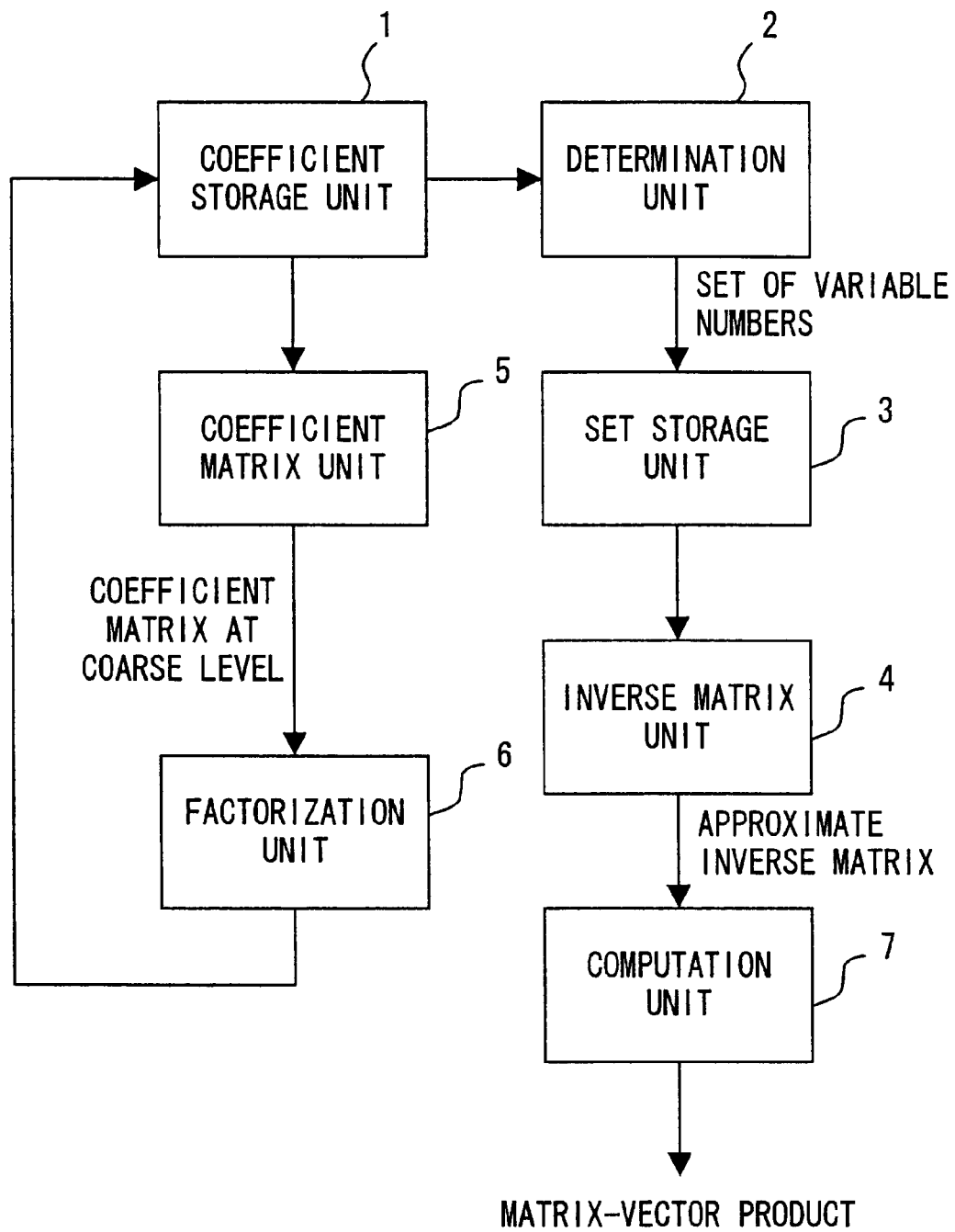
F I G. 1

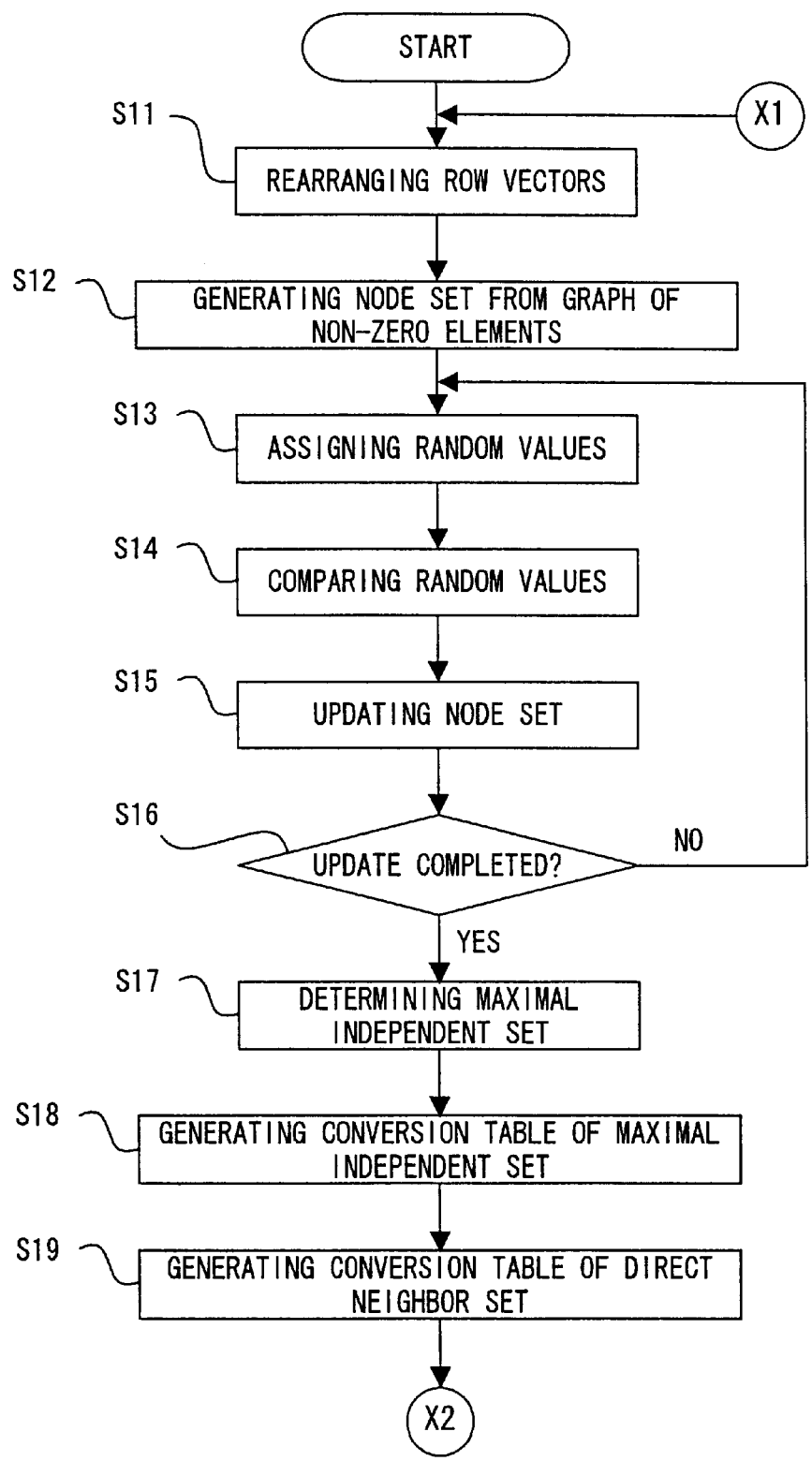
F I G. 3

$$
A \quad\quad\quad AE \quad\quad\quad ICOL
$$

$$
\begin{bmatrix} 1 & 0 & 3 & 3 & 0 \\ 0 & 1 & 0 & 0 & 0 \\ 0 & 0 & 1 & 0 & 0 \\ 0 & 2 & 0 & 1 & 0 \\ 0 & 2 & 0 & 0 & 1 \end{bmatrix} \rightarrow \begin{bmatrix} 1 & 3 & 3 \\ 1 & 0 & 0 \\ 1 & 0 & 0 \\ 2 & 1 & 0 \\ 2 & 1 & 0 \end{bmatrix} \quad \begin{bmatrix} 1 & 3 & 4 \\ 2 & 2 & 2 \\ 3 & 3 & 3 \\ 2 & 4 & 4 \\ 2 & 5 & 5 \end{bmatrix}
$$

F I G. 5

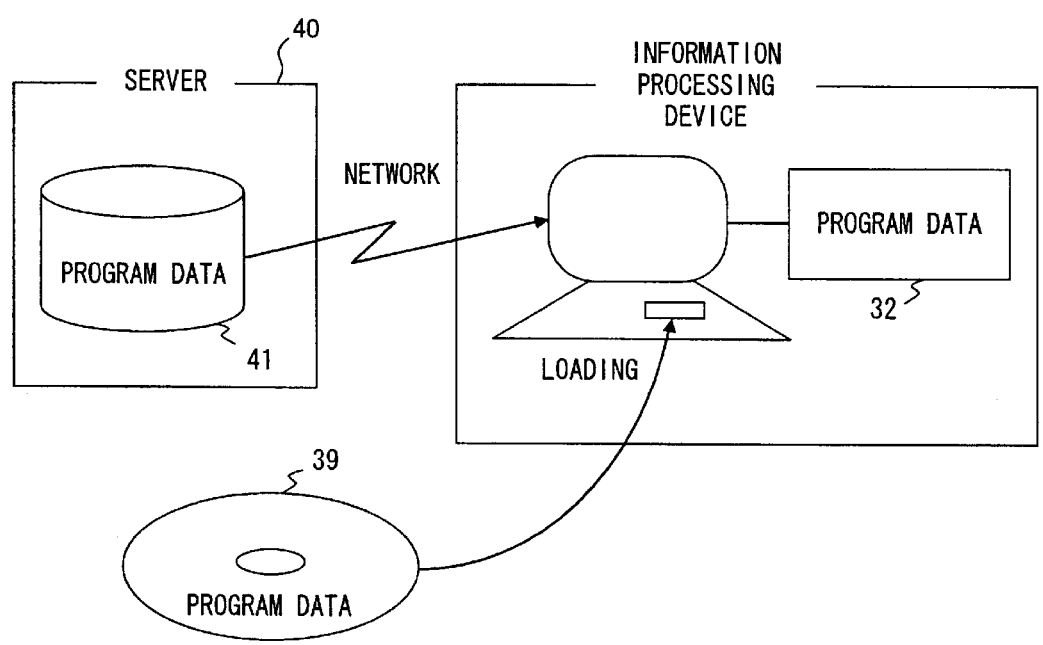
F I G. 1 1

PROCESSING APPARATUS FOR PERFORMING PRECONDITIONING PROCESS THROUGH MULTILEVEL BLOCK INCOMPLETE FACTORIZATION

BACKGROUND OF THE INVENTION

1. Field of the Invention

The present invention relates to an iteration method used to solve simultaneous linear equations, and more specifically to a processing apparatus for performing a preconditioning process in the iteration method.

2. Description of the Related Art

In analyzing a physical phenomenon, it is often necessary to solve simultaneous linear equations containing a large matrix as a coefficient matrix as follows.

$$Ax=b \qquad (1)$$

where A indicates a coefficient matrix of n×n, x indicates an n-dimensional variable vector, and b indicates an n-dimensional constant vector. It is not rare that the value of n is approximately $10^6$.

The above described large simultaneous linear equations are used in various scientific and engineering computation for weather forecasting, designing an atomic furnace, analyzing a semiconductor circuit, analyzing a fluid in aeronautics, analyzing a structure, etc. Therefore, it is one of the important objects in the scientific and engineering computation to efficiently and quickly solve large simultaneous linear equations.

One of the methods for solving an equation (1) using a computer is a direct method based on the Gaussian elimination method in which A is LU-factorized. However, when A is a large sparse matrix, there can be only a few non-zero elements in each row, and it is wasteful in computation cost and storage area. Therefore, in such cases, an iteration method is often used to obtain an approximate solution by repeatedly obtaining simple matrix-vector products.

A preconditioning process is used as a method for accelerating the convergence of the iteration method on a sparse matrix. In this process, the equation (1) is transformed as follows using an appropriate preconditioner matrix $M^{-1}$.

$$M^{-1}Ax=M^{-1}b \qquad (2)$$

By applying the iteration method to the equation (2) above, an approximate solution of the equation (1) can be obtained. At this time, M corresponds to the block incomplete factorization (BIF) of A, and $M^{-1}$ indicates an inverse matrix of M. Thus, an algebraic multilevel iteration method is known as a method of performing such a preconditioning process through the block incomplete factorization of A.

However, the preconditioning process in the above mentioned conventional algebraic multilevel iteration method has the following problems.

Normally, the preconditioning process in the algebraic multilevel iteration method can be applied to a problem in which a coefficient matrix A is an M-matrix, and has the function of accelerating the convergence. That A is an M-matrix refers to that $A=(a_{ij})$ is a regular matrix, and satisfies the following two conditions.

(1) $a_{ij} \leq 0$ (i≠j) (non-diagonal elements of A are 0 or negative)

(2) $A^{-1} \geq 0$ (all elements of inverse matrix $A^{-1}$ of A are not negative)

However, when A is not an M-matrix, the preconditioning process in the algebraic multilevel iteration method does not effectively work, and the computation does not converge.

SUMMARY OF THE INVENTION

An object of the present invention is to provide a processing apparatus for performing a preconditioning process capable of accelerating the convergence of computation in the iteration method used on simultaneous linear equations in which a coefficient matrix is not an M-matrix.

The processing apparatus according to the present invention comprises a coefficient storage unit, a determination unit, a set storage unit, an inverse matrix unit, a coefficient matrix unit, a factorization unit, and a computation unit and performs a preconditioning process for an iteration method used to solve simultaneous linear equations through performing multilevel block incomplete factorization.

The coefficient storage unit stores a coefficient matrix at a certain level in the block incomplete factorization. The determination unit determines a set of variable numbers of variables to be removed so that a block matrix comprising elements, which have the variable numbers of the variables to be removed as row numbers and column numbers, of the coefficient matrix stored in the coefficient storage unit can be diagonal dominant.

The set storage unit stores information about the determined set of variable numbers. The inverse matrix unit obtains an approximate inverse matrix of the block matrix according to the information stored in the set storage unit.

The coefficient matrix unit obtains a coefficient matrix at a coarse level from a block matrix comprising elements, which have variable numbers of remaining variables as row numbers and column numbers, of the coefficient matrix stored in the coefficient storage unit.

The factorization unit stores the coefficient matrix at the coarse level in the coefficient storage unit to perform subsequent block incomplete factorization. The computation unit computes a matrix-vector product in the iteration method using the approximate inverse matrix.

BRIEF DESCRIPTIONS OF THE DRAWINGS

FIG. 1 shows the principle of the processing apparatus according to the present invention;

FIG. 3 is a flowchart (1) of the preconditioning process;

FIG. 5 shows an Ellpack storage method;

FIG. 11 shows storage media.

DESCRIPTIONS OF THE PREFERRED EMBODIMENTS

Figure 2:
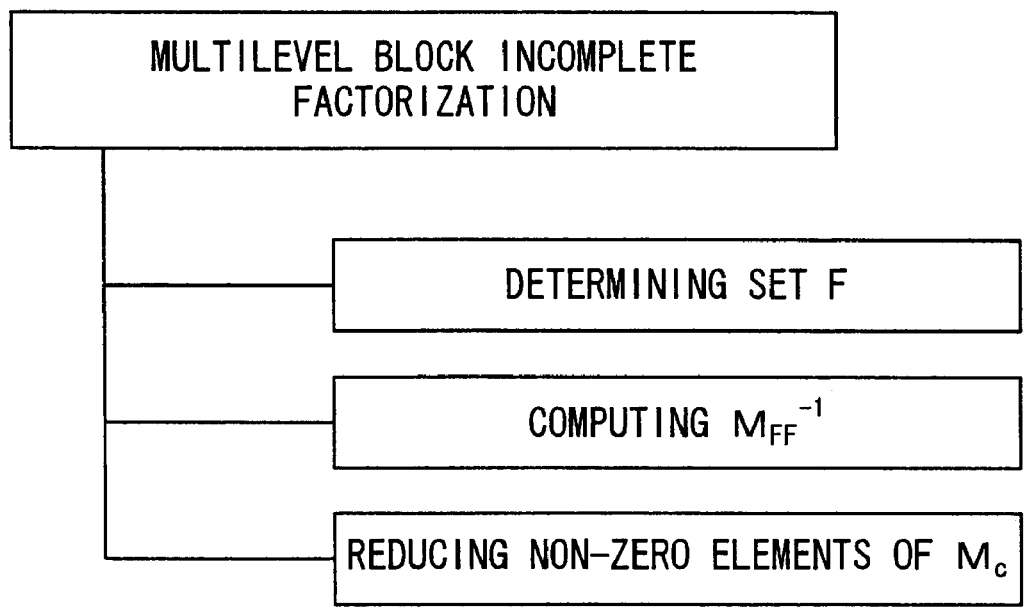
FIG. 2 shows the multilevel block incomplete factorization.

The embodiments of the present invention are described below in detail by referring to the attached drawings.

FIG. 1 shows the principle of the processing apparatus according to the present invention. The processing apparatus shown in FIG. 1 includes a coefficient storage unit 1, a determination unit 2, a set storage unit 3, an inverse matrix unit 4, a coefficient matrix unit 5, a factorization unit 6, and a computation unit 7. The apparatus performs a preconditioning process for the iteration method used to solve simultaneous linear equations through multilevel block incomplete factorization.

The coefficient storage unit 1 stores a coefficient matrix at a certain level of block incomplete factorization. The determination unit 2 determines a set of variable numbers of variables to be removed so that a block matrix comprising elements, which have the variable numbers of the variables to be removed as row numbers and column numbers, of the coefficient matrix stored in the coefficient storage unit 1 can be diagonal dominant. The set storage unit 3 stores the information about the determined set of variable numbers.

The inverse matrix unit 4 obtains an approximate inverse matrix of the block matrix according to the information stored in the set storage unit 3. The coefficient matrix unit 5 obtains a coefficient matrix at a coarse level from a block matrix comprising elements, which have the variable numbers of remaining variables as row numbers and column numbers, of the coefficient matrix stored in the coefficient storage unit 1. Then, the factorization unit 6 stores the coefficient matrix at the coarse level in the coefficient storage unit 1 to perform subsequent block incomplete factorization.

The computation unit 7 computes a matrix-vector product in the iteration method using the obtained approximate inverse matrix.

In the above mentioned processing apparatus, a coefficient matrix factorized at a certain level of block incomplete factorization is stored in the coefficient storage unit 1. The determination unit 2 refers to the information about the coefficient matrix, determines a set of variable numbers of variables to be removed from a process target so that a block matrix comprising coefficients of the variables to be removed can be diagonal dominant, and stores the information about the set in the set storage unit 3.

Then, the inverse matrix unit 4 obtains an approximation of an inverse matrix of the block matrix comprising the coefficients of the variables to be removed. The coefficient matrix unit 5 computes a coefficient matrix at the next level from a block matrix comprising the coefficients of variables remaining as a process target. Then, the factorization unit 6 stores the obtained coefficient matrix as a coefficient matrix to be factorized in the coefficient storage unit 1, thereby recursively performing the block incomplete factorization at the next level.

The computation unit 7 performs a preconditioning process for the iteration method by recursively computing a matrix-vector product required in the iteration method using the approximate inverse matrix at each level obtained by the recursive block incomplete factorization.

In the case of a diagonal dominant matrix, as described later, an inverse matrix can be obtained by performing an iterative computation with given approximate precision. Therefore, any sparse matrix can be factorized with appropriate approximate precision by determining a set of variable numbers of variables to be removed so that the block matrix comprising the coefficients of the variables to be removed can be diagonal dominant. In the above mentioned block incomplete factorization, a preconditioning process for accelerating the convergence of the iteration method can be performed on a coefficient matrix which is not an M-matrix.

For example, the coefficient storage unit 1 and the set storage unit 3 shown in FIG. 1 correspond to shared memory 14 shown in FIG. 6 or memory 32 shown in FIG. 10 described later. The determination unit 2, the inverse matrix unit 4, the coefficient matrix unit 5, the factorization unit 6, and the computation unit 7 shown in FIG. 1 correspond to a processor 11 shown in FIG. 6 or a central processing unit (CPU) 31 shown in FIG. 10.

The set of the variable numbers of the variables to be removed corresponds to a set F described later, and the block matrix comprising elements which have the variable numbers as row numbers and column numbers corresponds to a matrix AFF in the equation (3) described later. The approximate inverse matrix corresponds to $M_{FF}^{-1}$ in the equation (4) or $F_{FF}$ shown in FIG. 4 described later. The block matrix comprising elements which have the variable numbers of the remaining variables as the row numbers and the column numbers corresponds to the matrix $A_{CC}$ in the equation (3). The coefficient matrix at the coarse level corresponds to the matrix $A_C$ shown in FIG. 4 or $M_C$ in the equation (4).

Normally, in the iteration method in which a preconditioning process is performed, it is necessary to repeatedly compute a matrix-vector product $M^{-1}q$ of $M^{-1}$ in the equation (2) and the n-dimensional vector q. The processing apparatus according to the present invention performs multilevel block incomplete factorization on a coefficient matrix of simultaneous linear equations, and computes $M^{-1}q$ using a result obtained at each level in the preconditioning process by the algebraic multilevel iteration method.

First, a set of variable numbers appropriately selected from a set $\{1, \ldots, n\}$ of the variable numbers of simultaneous linear equations is defined as C, and the complementary set of C is defined as F. Then, an n×n matrix A can be transformed into the following form.

$$A = \begin{bmatrix} A_{FF} & A_{FC} \\ A_{CF} & A_{CC} \end{bmatrix} \quad (3)$$

A set C corresponds to a set of variable numbers of remaining variables, and a set F corresponds to a set of variable numbers of variables to be removed. The row number and the column number of an element of the block matrix $A_{CC}$ are represented by an element of the set C. The numbers of the rows and the columns of $A_{CC}$ match the number of the elements of the set C. Similarly, the row number and the column number of an element of the block matrix $A_{FF}$ are represented by an element of the set F, and the numbers of the rows and the columns of $A_{FF}$ match the number of the elements of the set F.

Assuming that the approximate inverse matrix of $A_{FF}$ is $M_{FF}^{-1}$, and $A_C := A_{CC} - A_{CF} M_{FF}^{-1} A_{FC}$, $A_C$ can be approximated by, for example, $B_C = A_C - R_C$. Here, $R_C$ is a matrix containing non-zero elements to be removed by the approximation. Assuming that the approximation of $A_C$ is expressed by $M_C$, the block incomplete factorization M of A is represented as follows.

$$M = \begin{bmatrix} M_{FF} & 0 \\ A_{CF} & I \end{bmatrix} \begin{bmatrix} I & M_{FF}^{-1} A_{FC} \\ 0 & M_C \end{bmatrix} \quad (4)$$

Then, the block incomplete factorization of $M_C$ is recursively repeated from a coarse level to a coarser level to obtain the block incomplete factorization as indicated by the equation (4) at each level. In addition, $p := M^{-1} q = \text{BIF}(0, q)$ can be recursively computed using the block matrix in the equation (4). Assuming that the first level is 0, and the coarsest level is L, the computation algorithm of the matrix-vector product is represented as follows.

```
BIF(k, q)
    if (k = L)
        solve Ap = q
    else
        (q_F, q_C) ← q
        q_C ← q_C - A_CF M_FF^-1 q_F
        p_C ← BIF(k + 1, q_C)
```

-continued $$p_F \leftarrow M_{FF}^{-1}(q_F - A_{FC}p_C)$$
$$p \leftarrow (p_F, p_C)$$
endif
return p where a degree of the approximation of $I = M_C^{-1}A_C$ (I indicates a unit matrix) can be adjusted using the values of $|I - M_{FF}^{-1}A_{FF}|$, $|M_C^{-1}R_C|$, and $|I - M_C^{-1}B_C|$.

The processing apparatus approximately obtains an inverse matrix $M_{FF}^{-1}$ required at each level with given precision in the process of stepwise performing the block incomplete factorization. Using the inverse matrix, a matrix $A_C$ required in the factorization at the next level (at a coarse level) is obtained, and the sparsity of $A_C$ is determined with the approximate precision taken into account. The elements of the set F are determined such that the number of elements of the matrix $A_C$ can be the smallest possible, that is, the number of elements of the matrix $A_{FF}$ can be the largest possible, at each level of the block incomplete factorization.

Therefore, in the multilevel block incomplete factorization, the determination of the set F, the computation of $M_{FF}^{-1}$, and the reduction of non-zero elements of $M_C$ can be recursively repeated as shown in FIG. 2. In the equation (3), if $A_{FF}$ is a diagonal matrix, the inverse matrix $A_{FF}^{-1}$ can be easily obtained. If the set F can be determined such that $A_{FF}$ can be diagonal dominant with this condition loosened a little, $M_{FF}^{-1}$ can be obtained in iteration computation with any approximate precision. Diagonal dominant $A_{FF}$ refers to that the elements of $A_{FF}$ satisfy the following condition with $\lambda$ defined as a predetermined constant.

$$\sum_{j \neq i \in F} |a_{i,j}| \leq \lambda |a_{i,i}| \quad (5)$$

If the set F is the largest possible, then $A_{CC}$ is small, and $A_C$ is also small. Therefore, the factorization of the matrix can be prompted. With the above mentioned block incomplete factorization, even a matrix which is not an M-matrix can be factorized with appropriate approximate precision, and the preconditioning process of accelerating the convergence of the iteration method can be performed.

Figure 4:
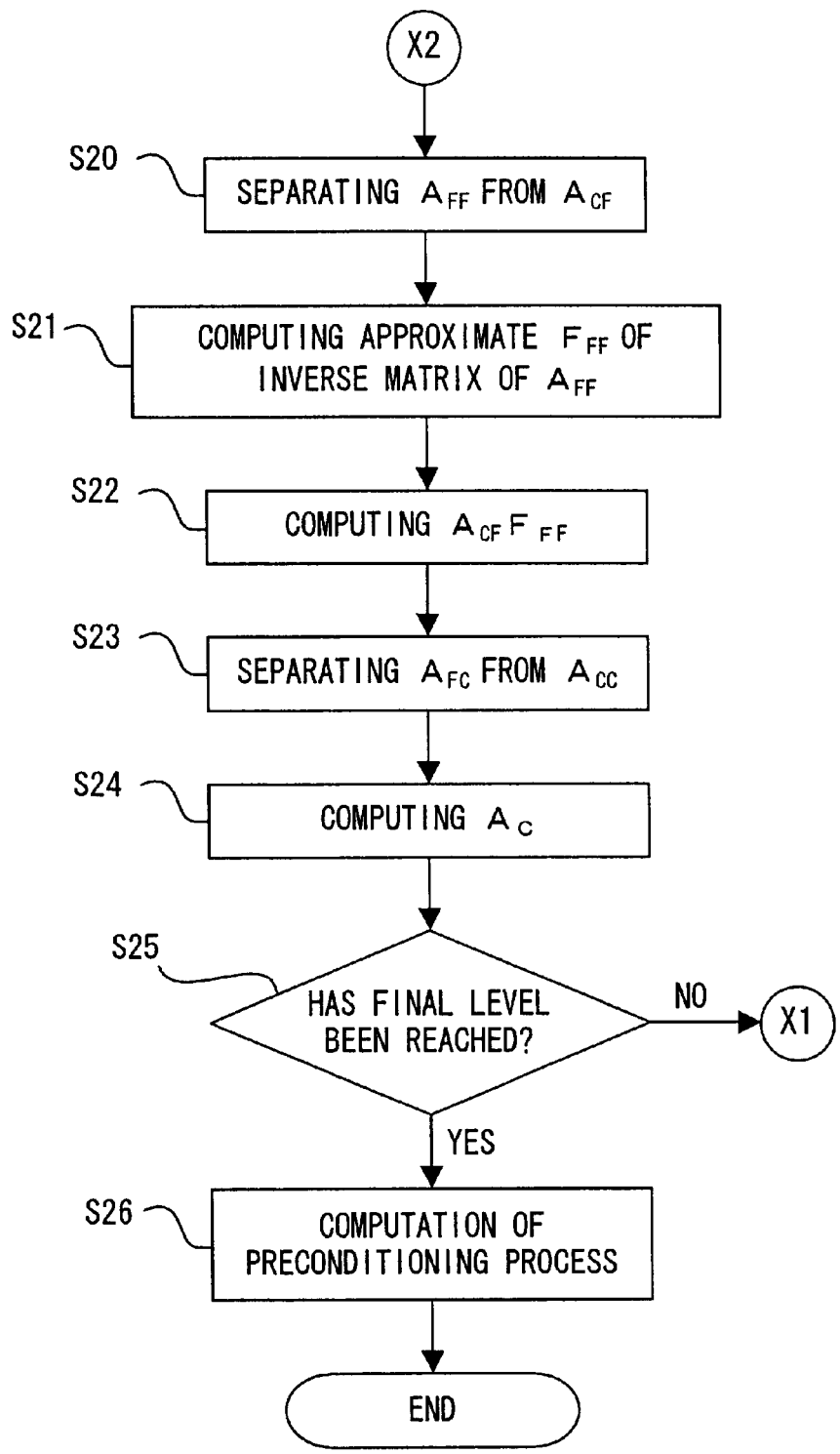
FIG. 4 is a flowchart (2) of the preconditioning process.

FIGS. 3 and 4 are flowcharts of the preconditioning process containing the multilevel block incomplete factorization. At each level of the recursive algorithm, the set F is determined by performing the process shown in FIG. 3, and the variable numbers forming $A_C$ at a coarse level can be selected.

First, the processing apparatus rearranges each row vector of the matrix A to be factorized such that a diagonal element comes first to extract a diagonal dominant $A_{FF}$ (step S11 shown in FIG. 3). However, at the second and subsequent level, the $A_C$ obtained in the factorization at the previous level is used as a matrix A.

The coefficient matrix A of simultaneous linear equations is stored in the memory of the processing apparatus in an Ellpack storage method. In the Ellpack storage method, the non-zero elements of a row vector are stored after being compressed leftward, and the column number of a column having a non-zero element is stored in a corresponding element in an integer type array. At this time, a portion which cannot be compressed is filled with zeros, and the corresponding elements in the integer type array store the row number instead of a column number. Thus, the requirements of memory can be reduced by compressing and storing a sparse matrix.

FIG. 5 shows an example of the above mentioned Ellpack storage method. In FIG. 5, the information about the coefficient matrix A is stored after being divided into a real type two-dimensional array AE and an integer type two-dimensional array ICOL. The array AE stores row vectors of the A compressed in the Ellpack storage method, and the array ICOL stores column numbers of non-zero elements of the A. The elements of the array ICOL corresponding to the zero elements of the array AE store the row numbers of the elements.

The processing apparatus rearranges the elements of each row vector of a matrix stored in the Ellpack storage method, stores the diagonal element of A as the first element, and stores other elements from the largest value with an absolute value and the distance from a diagonal element taken into account. Correspondingly, the elements of ICOL are also rearranged.

Assuming that (i, j) element of ICOL is $k_{i,j}$, the elements of the original coefficient matrix A can be represented by $a_{i,k_{i,j}}$. At this time, the elements of a row vector can be rearranged under the following condition.

$$(1+\gamma)|a_{i,k_{i,j+1}}| \leq |a_{i,k_{i,j}}| \text{ or } \{(1-\gamma)|a_{i,k_{i,j+1}}| \leq a_{i,k_{i,j}}| \text{ and } |k_{i,j+1} - i| \leq |k_{i,j} - i|\}$$

where $\gamma$ is a predetermined constant. For example, $\gamma = 0.15$. The elements having equal absolute values are positioned from left to right in order from the element having a longest distance from a diagonal element.

Then, the processing apparatus generates a set V of the nodes of a graph G comprising non-zero elements of A (step S12). At this time, a set excluding the node corresponding to the element not diagonal dominant from a set of all nodes is defined as V to maintain the $A_{FF}$ as diagonal dominant, and a set of removed nodes is an initial value of the direct neighbor set N.

First, assume that there is a graph having a subscript i of the element of A as a node (unknown value). Among pairs of nodes (i, j), a pair of (i, j) corresponding to non-zero $a_{i,j}$ or $a_{j,i}$ are extracted, and these nodes are linked by an edge. Therefore, an edge (i, j) corresponds to a non-zero element of A. Then, to identify the node belonging to the graph G, a flag is set for a one-dimensional array.

Then, an element disturbing the diagonal dominant is extracted from A, and the initial value of the direct neighbor set N is determined. At this time, the following determination is performed on each of all rearranged row vectors. The determination is performed rightward in order from the second element in the row vector, and is repeated until all elements are processed.

```
s = 0
N = φ
do j = k, 2, −1
    if (s + |a_{i,ki,j}| > λ|a_{i,i}|) then
        N = N ∪ {k_{i,j}}
    else
        s = s + |a_{i,ki,j}|
    endif
enddo
```

Then, the set V is generated by removing the nodes contained in the direct neighbor set N from the set of all nodes.

The processing apparatus extracts the maximal independent set used as a set F from the set V in the processes in steps S13 through S17. In this example, the subsets (independent sets) of V, any two subscripts extracted from which do not correspond to the above mentioned edge (i, j), are selected from among subsets I of V. Then, among the independent sets, a set having the largest number of elements is selected as the maximal independent set. The maximal independent set can be obtained by the following algorithm.

ISET(G): procedure of extracting an independent set from the graph G

SEG(graph(G), V): a set of edges of a subset of the graph G, two nodes of each edge belonging to V N(I): one of the nodes of the edge of the graph G not belonging to the independent set I when another node belongs to the independent set I (direct neighbor set)

E: a set of edges of the graph G

F: the maximal independent set (initial value is φ)

while ((V≠φ) and (E≠φ)) do
   I:=ISET(G)
   F:=F∪I
   V:=V−(I∪N(I))
   G:=SEG(graph(G), V)
enddo
F:=F∪V The graph G is represented by a two-dimensional array G(m, 2) with m defined as the total number of edges. When the nodes i and j belong to the graph G for a non-zero element $a_{ij}$ of the matrix A, the node numbers i and j are respectively stored in the array elements G(k, 1) and G(k, 2) (k=1, ..., m).

In the process of the ISET(G), for example, an independent set is generated using random values. In this case, a random value in the range of (0, 1] is associated with each node number, two random values corresponding to the array elements G(k, 1) and G(k, 2) are compared with each other, and a node having a smaller number is incorporated into the independent set, and the other node is excluded from the independent set.

To associate each node with a random value, a one-dimensional array stores random values. In addition, another one-dimensional array (maximal independent flag array) storing a flag indicating whether or not a node belongs to the maximal independent set is prepared, and the value 'on' is stored as the initial value of the flag corresponding to each node. When two random values are compared with each other, the flag of the node corresponding to a larger value is changed into the value 'off'. Thus, a set of the nodes having 'on' flags is extracted as an independent set.

The above mentioned algorithm is explained below by referring to the process steps shown in FIG. 3. First, the processing apparatus generates a graph G from a set V, and a random value is assigned to each node (step S13). Then, the values of the random values of two nodes are compared with each other, the node corresponding to a larger value is removed, and the set of remaining nodes is defined as an independent set I (step S14).

Then, the sets V, I, and F are updated (step S15). In this example, the independent set I and the direct neighbor set N(I) are removed from the set V to generate a new set V. Then, N(I) is added to a sum set N of direct neighbor sets, and the independent set I is added to the maximal independent set. The direct neighbor set N can also be obtained by removing the elements of the maximal independent set F from all nodes of the graph.

Then, it is determined whether or not the update of sets is completed (step S16). In this example, it is determined that the update is completed when the independent set I becomes null or the V or E (remaining nodes or edges) becomes empty.

When the update is not completed, the processes in and after step S13 are repeated. When the update is completed, the set V is added to the maximal independent set F, and the final maximal independent set F is determined (step S17). At this time, the nodes having an 'on' flag in the maximal independent flag array indicate the variable numbers of the set F. Additionally, a one-dimensional array (direct neighbor flag array) storing a flag indicating that a node has been removed from the graph since it belongs to the direct neighbor set N is prepared, and the flag of the corresponding node is set 'on'.

Then, the processing apparatus generates a conversion table of the variable numbers of the obtained maximal independent set (step S18). In this example, the maximal independent flag array is referred to for identifying the variable numbers belonging to the maximal independent set from the nodes of the graph, and the serial number of each of the nodes belonging to the final maximal independent set is reassigned. Then, the number is set for the flag of the maximal independent flag array. Thus, using the maximal independent flag array, a conversion table is generated for conversion from the original variable number set into new variable numbers of the maximal independent set.

Then, a conversion table of variable numbers of a direct neighbor set is generated (step S19). In this case, as in the case of the maximal independent set, the direct neighbor flag array is referred to, and a serial number of each of the nodes belonging to the direct neighbor set is reassigned to an element whose flag is set 'on'. Thus, using the direct neighbor flag array, a conversion table is generated for conversion from the original variable number set to new variable numbers of the direct neighbor set.

Then, using the obtained conversion table, $A_{FF}$ is separated from $A_{CF}$ (step S20 shown in FIG. 4). At this time, relating to the elements of the row vector of A, the new variable numbers of the conversion table are referred to, only the nodes belonging to the maximal independent set are extracted, and the elements corresponding to these nodes of the row vector are left-justified and stored in the array AE. Correspondingly, the array ICOL is rewritten. Then, both row vectors of AE and ICOL are allotted to $A_{FF}$ and $A_{CF}$, thereby separating $A_{FF}$ from $A_{CF}$.

Then, the approximate inverse matrix $F_{FF}$ of $A_{FF}$ is obtained in the iteration method (step S21). Since the $A_{FF}$ is diagonal dominant, the diagonal matrix $D_{FF}$ comprising its diagonal elements exists. Therefore, when $M_{FF}^{-1}$ is obtained in the iteration method using the inverse matrix $D_{FF}^{-1}$ of $D_{FF}$ as an initial solution, the computation converges. At this time, $|I-M_{FF}^{-1}A_{FF}|$ is iteratively computed, $M_{FF}^{-1}$ is obtained with expected approximate precision, and an obtained $M_{FF}^{-1}$ is defined as $F_{FF}$. Practically, assuming that $M_{FF,1}^{-1}=D_{FF}^{-1}$, the following computation is recursively performed.

$$M_{FF,p}^{-1}=M_{FF,p-1}^{-1}+(I-M_{FF,p-1}^{-1}A_{FF})D_{FF}^{-1} \quad (6)$$

$$\rho p=|I-M_{FF,p}^{-1}A_{FF}| \quad (7)$$

Then, using $\tau_F$ as a predetermined constant, the approximation up to the point where $\rho p<\tau_F$ is satisfied is adopted. A matrix product between sparse matrices stored in the Ellpack format appears in the equation (6), and the computation of it is performed in the following procedure.

Normally, in the matrix operation in the form of A=A+αB×C, t=αB×C is first computed using a temporary area in the memory, and then A=A+t is computed. In the computation of t=αB×C, the largest number of non-zero elements in each row vector of B and C stored in the Ellpack format is set to nrb and nrc respectively, and an area in which the value of the second dimension is temporarily nrb×nrc is reserved. Then, the column vector of C is multiplied by each element of B. When α=1, the procedure can be shown as follows.

(1) The array tmp of t is computed as shown below.

```
ii=1
do i=1, nrc
  do k=1, nrb
    do j=1, n
      tmp(j, ii)=b(j, k)*c(bicol(j, k), i)
      tmpicol(j, ii)=cicol(bicol(j, k), i)
    enddo
    ii=ii+1
  enddo
enddo
```

(2) The elements of the row vector of tmp are sorted in the order of the numbers of the column vectors to which they belong.
(3) The elements of the row vector of A are similarly sorted.
(4) A=A+tmp is computed. In this example, the following process is performed for each row vector. First, tmpicol(i, k) matching ICOL(i, j) of A(i, j) is searched for while increasing the value of k. If a matching element can be detected, then tmp(i, k) is added to A(i, j). If ICOL(i, j) matching tmpicol(i, k) cannot be detected, then tmp(i, k) and tmpicol(i, k) are added to the i-th rows of A and ICOL as new elements.

Then, $A_{CF}F_{FF}$ used in the computation in the preconditioning process is computed (step S22), and $A_{FC}$ is separated from $A_{CC}$ (step S23). At this time, as in the process in step S20, new variable numbers of the conversion table are referred to relating to the elements of the row vector of A, only the nodes belonging to the direct neighbor set are extracted, and the array ICOL is rewritten. Then, the row vector is allotted to $A_{FC}$ and $A_{CC}$.

Then, $A_C = A_{CC} - A_{CF}F_{FF}A_{FC}$ is computed (step S24). In this example, as in the computation of the matrix product in step S21, $A_{CF}F_{FF}A_{FC}$ is stored in tmp, and is subtracted from $A_{CC}$. At this time, while the absolute value of each element of $A_C$ is being determined, an element having a value smaller than a given value is dropped, and an approximate of $A_C$ is obtained by $M_C = A_C - R_C$, thereby maintaining the sparsity of $A_C$. Then, $M_C$ is used as a result of the computation of $A_C$.

At this time, for example, it is determined whether or not the condition of (absolute value of an element of $A_C$)<τ×(sum of absolute values of elements of a row vector to which the element belongs) is satisfied using τ as a predetermined constant, and the element satisfying the condition is dropped. Practically, the condition for determination of RC is given by $|M_C^{-1}R_C|_1 < \tau$. For the n×n matrix $B=(b_{i,j})$, $|B|_1$ is defined by the following equation.

$$|B|_1 = \max_{i=1}^{n} \sum_{j=1}^{n} |b_{i,j}| \qquad (8)$$

The unknown matrix $M_C$ is approximated by the following diagonal matrix.

$$m_{i,j} = \delta_{i,j} \text{sign}(a_{i,i}) \sum_{l=1}^{n} |a_{i,l}| \qquad (9)$$

In the equation (9) above, sign(x) equals 1 when x≧0, and −1 when x<0. In this approximation, when the element $a_{i,j}$ of $A_C$ satisfies the following equation, the element is dropped.

$$|a_{i,j}| < \tau \times m_{i,i} \qquad (10)$$

Actually, a sum of the absolute values of the elements of the row vector of $A_C$ is obtained, and the condition of the equation (10) is determined in order from left to right for each element in the row. If the condition is satisfied, the element is removed and the next element is left-justified and stored.

Then, it is determined whether or not the obtained $A_C$ corresponds to the coarsest level (final level) of the factorization (step S25). If it does not correspond to the final level, the obtained $A_C$ is used as A, and the processes in and after step S11 shown in FIG. 3 are repeated. If the final level has been reached, the factorization of the matrix is completed, and the computation of the preconditioning process is performed using the result (step S26), thereby terminating the process. In the computation of the preconditioning process, a matrix-vector product $M^{-1}q$ is obtained using the block incomplete factorization at each level as described above.

Next, the configuration in which the above mentioned preconditioning process is performed in parallel is described below by referring to FIGS. 6 through 9.

Figure 6:
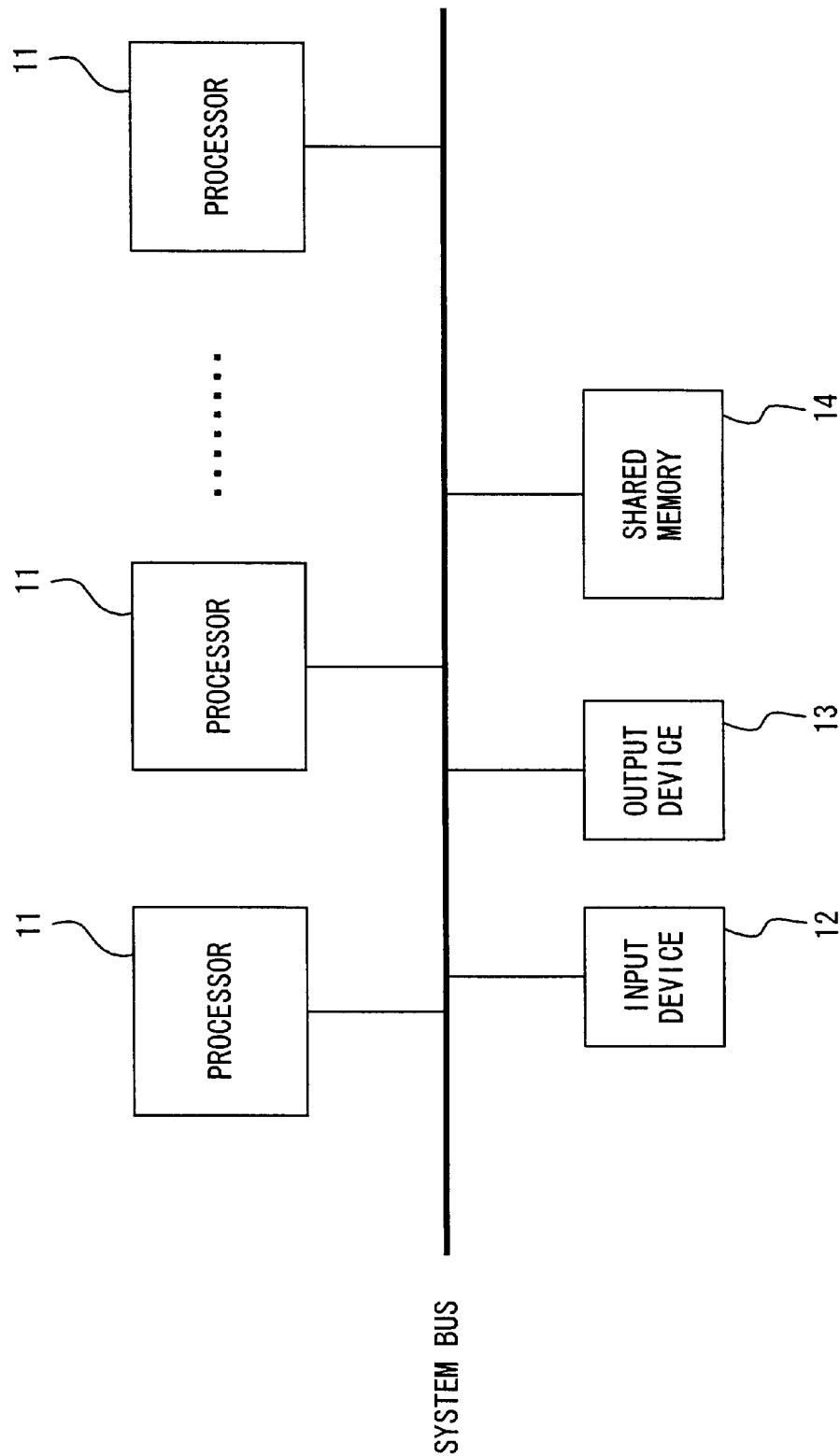
FIG. 6 shows the configuration of the multi-processor system.

FIG. 6 shows the configuration of a symmetric multiprocessor (SMP) system (parallel computer) The multiprocessor system shown in FIG. 6 comprises a plurality of processors 11, an input device 12, an output device 13, and the shared memory 14. They are connected through a system bus 15. The input device 12 is used in inputting an instruction and information from a user. The output device 13 is used in outputting an inquiry and a process result to a user.

The processors 11 correspond to the CPUs (central processing units) with cache, and are coupled each other through the shared memory 14. In this case, the application program in the parallel process is described in OpenMP which is a parallel extended language for the SMP using a process unit referred to as a thread.

In the OpenMP, the attributes SHARED and PRIVATE can be assigned to a variable. A variable having the SHARED attribute can be referred to and written into commonly by threads. Furthermore, in the OpenMP, the parallel process can be controlled while determining the number of each thread using the BARRIER synchronization.

Figure 7:
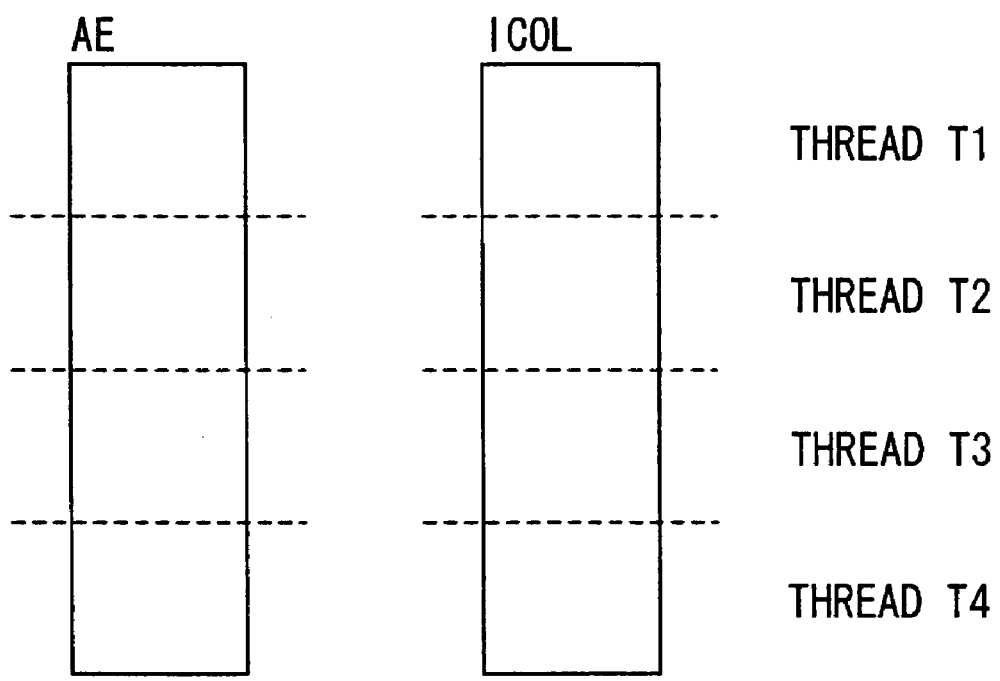
FIG. 7 shows the division of an array.

In this system, the node numbers to be processed can be divided by the number of processors. Then, as shown in FIG. 7, in the matrix A stored in the array AE and ICOL in the Ellpack format, the computation of the elements relating to the numbers assigned to each processor is performed by each thread. In this example, the threads T1, T2, T3, and T4 generated in different processors divide the matrix A.

Figure 8:
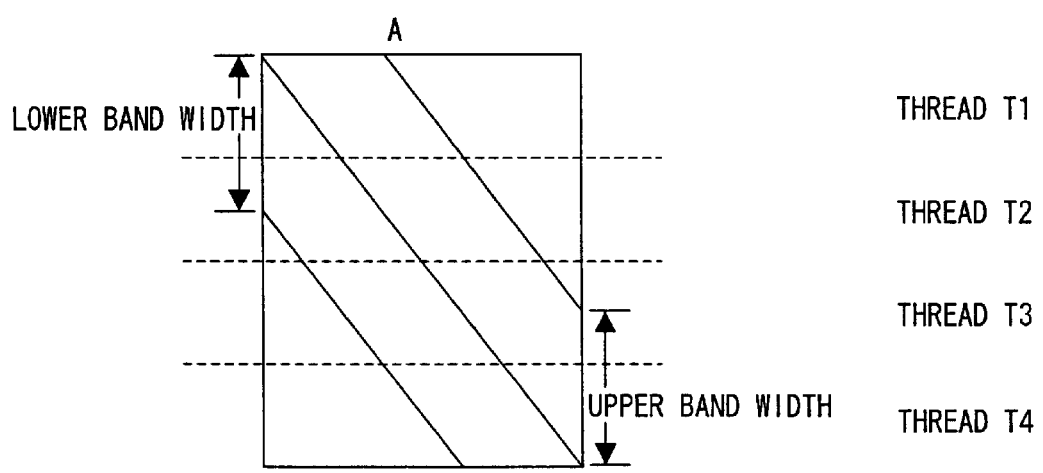
FIG. 8 shows band widths.

The portion of $A_{FF}$, $A_{CF}$, $A_{FC}$, and $A_{CC}$ taken charge of by each of the threads is stored in a shared area consecutive for each thread as a work area. At this time, as shown in FIG. 8, the band width (upper band width and lower band width) of the portion in which non-zero elements exist in a matrix is obtained, and the band width of the portion taken charge of by each thread is determined.

Figure 9:
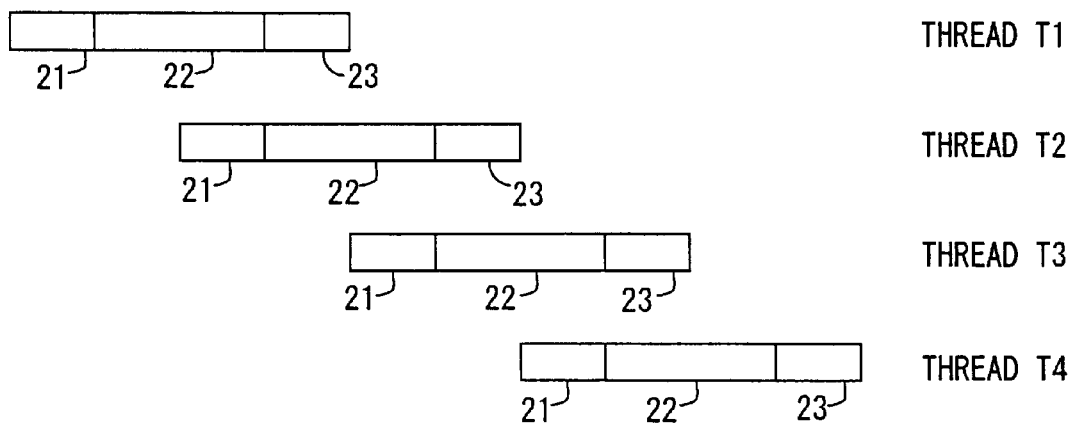
FIG. 9 shows storage areas.

In addition, the storage area of the array storing random values assigned to each node in step S13 shown in FIG. 3, the maximal independent flag array, the direct neighbor flag array, the variable number conversion tables, etc. are set as shown in FIG. 9. In FIG. 9, an excess area (overlap area) 21 of the lower band width is provided on the left of a storage area 22 of a portion taken charge of by each thread, and an overlap area 23 of the upper band width is provided on the right.

In the processes in steps S13 through S17, the algorithm for determining the maximal independent set is parallelized in the following method. In this example, 'on' and 'off' of the flag are respectively represented by integers of 1 and 0, and they are set using a built-in function MIN. The initial value of the maximal independent flag array can be 'on' for the nodes other than the nodes of the direct neighbor set, and the node removed as a direct neighbor set is set 'off'.

Each thread generates random values, and stores them in an area (taken charge of by each thread) other than the overlap area of a node forming part of the graph. Then, the random values are copied to an overlap area from the area of another thread taking charge of the portion. Thus, the random values of the nodes used by each thread are locally held in consecutive areas.

Then, each thread processes the pairs of nodes of all edges representing the graph taken charge of by each thread. The node to be processed exists in the range of the node numbers of the upper band width and the lower band width added to the node numbers of the portion taken charge of by each thread. Then two random values corresponding to a pair of nodes are compared with each other, and the flag of the node having a larger value is set 'off' in the maximal independent flag array.

When setting is completed for each thread, each thread copies flag information from other threads taking charge of the nodes of the overlap area, and stores the information in the overlap area of the maximal independent flag array. At this time, matching is made among the threads using the function MIN, and the area set 'off' by other threads is set 'off'.

Then, each thread scans the edges of the graph again and sets 'off' in a flag of a node of an edge in the direct neighbor flag array when the other node belongs to the maximal independent set. Additionally, each thread sets values of the overlap area of the direct neighbor flag array in a similar manner to the maximal independent flag array such that matching can be made among the threads.

Then, each thread scans the graph again, and maintains only the edge not belonging to the maximal independent set and the direct neighbor set as an edge forming part of the graph. At this time, only the edges forming the graph are stored, the number of elements of the maximal independent set is counted, and it is checked whether or not the number is zero. Further, the numbers of nodes and edges are counted, and it is checked whether or not the numbers are zero. If at least one of the number of elements of the maximal independent set and the numbers of nodes and edges is not zero, the processes in and after the process of generating random values are repeated for a new graph.

When the number of elements of the maximal independent set or the number of edges becomes zero, each thread completes the repeated processes, and sets 'on' in the flag of the node forming an edge in the direct neighbor flag array. Then, matching is made for the storage areas among threads.

Then, in step S18, the application counts the number of nodes belonging to the maximal independent set among the nodes (excluding the overlap area) taken charge of by each thread. Then, the count values of respective threads are stored in the one-dimensional array (shared area) of the size of the total number of the threads. According to this information, serial numbers are assigned to the nodes of the maximal independent set of each thread. At this time, positive integer numbers are assigned in order from 1 as the serial numbers.

Then, each thread writes a serial number corresponding to the node instead of 'on' of the maximal independent flag array, and generates a conversion table of variable numbers. In the conversion table, the variable numbers corresponding to positive integers correspond to the nodes belonging to the maximal independent set, and the variable numbers corresponding to 0 correspond to the nodes belonging to the direct neighbor set. Then, a part of the conversion table is copied from other threads corresponding to the overlap areas. In step S19, a conversion table of variable numbers of the direct neighbor set is similarly generated.

Then, in step S20 shown in FIG. 4, each thread reserves a work area in parallel, and separates $A_{FF}$ from $A_{CF}$ according to the conversion table of the maximal independent set.

In this case, only the elements $a_{i,j}$ of A whose subscript j belongs to the maximal independent set are stored as left-justified in AE, and the stored values of ICOL are rewritten into new variable numbers of the nodes.

Then, the largest value Nr of the numbers of non-zero elements of row vectors is obtained, and the storage areas of $A_{FF}$ and $A_{CF}$ (AE and ICOL) are reserved in the work area of each thread based on the Nr and the numbers of the elements of the maximal independent set and the direct neighbor set taken charge of by each thread. Then, the row vectors of AE and ICOL of A are assigned to the storage areas of $A_{FF}$ and $A_{CF}$. Similarly, in step S23, $A_{FC}$ is separated from $A_{CC}$ using the conversion table of the direct neighbor set.

In steps S21 and S24, the computation of sparse matrix products is performed in parallel. Each thread holds the corresponding portions of the matrices to be processed as shown in FIGS. 7 and 8.

In the above mentioned computation of tmp, the innermost do loop process is performed only on the portion assigned to each thread. Furthermore, relating to the necessary column vector of C, a work area having overlap areas of an upper band width and a lower band width is prepared, the portion held by each thread and the portions held by other threads are copied to the work area, and then the computing processes are performed in parallel by the threads.

In the parallel computation of $p=M^{-1}q$ in step S26, the application prepares a storage area for the portion taken charge of by each thread and overlap areas of the upper and lower band widths for each of the vector $q_F$ and $q_C$, and $q_F$ and $q_C$ are separated from the vector q using a conversion table. Each thread computes a matrix-vector product in parallel using the matrix portion assigned to the thread. At this time, an overlap area is used to refer to a process result of another thread.

Figure 10:
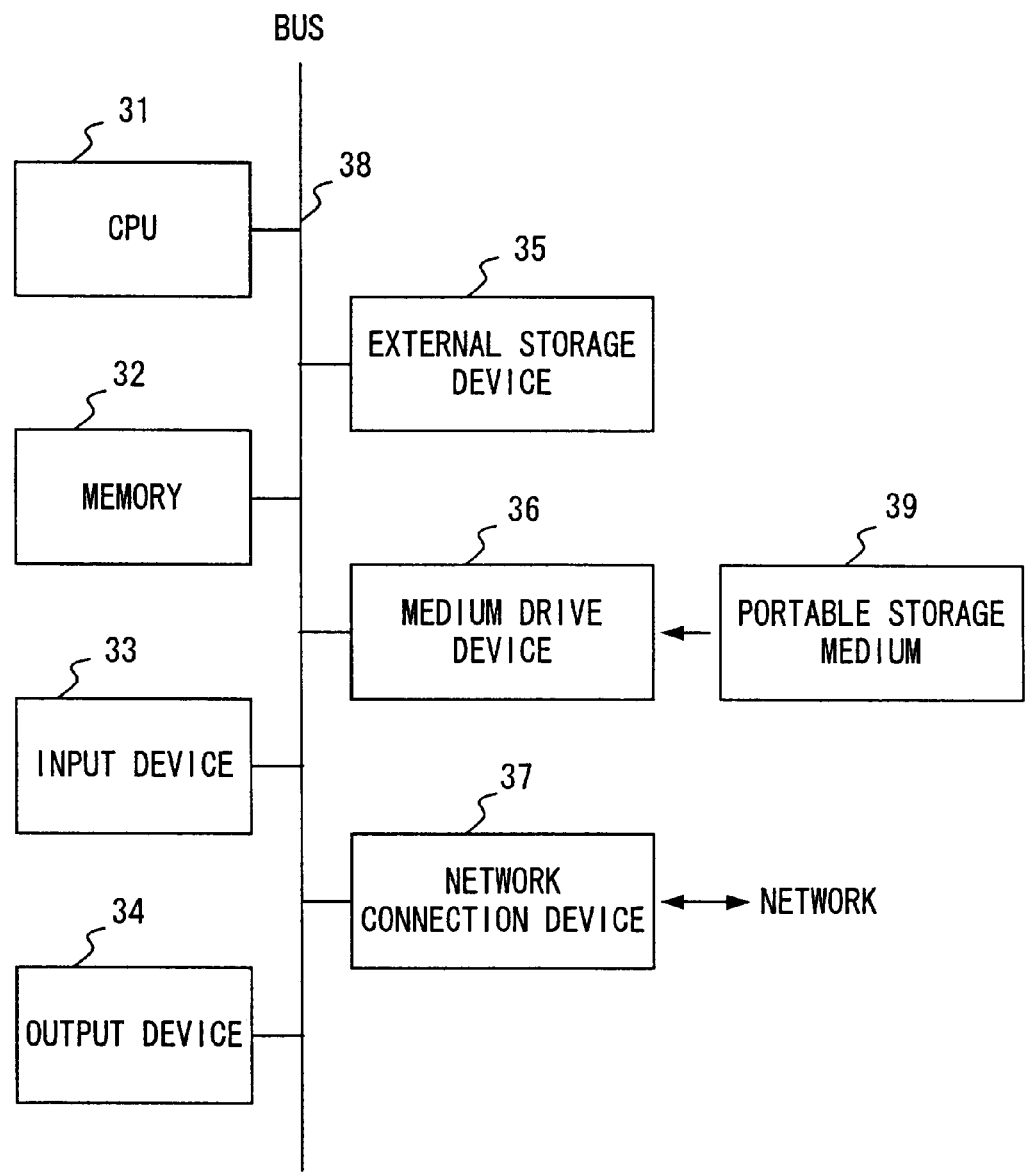
FIG. 10 shows the configuration of the information processing device.

The processing apparatus according to the present embodiment can be configured not only using a parallel computer, but also using any information processing device (computer) as shown in FIG. 10. The information processing device shown in FIG. 10 comprises a CPU (central processing unit) 31, a memory 32, an input device 33, an output device 34, an external storage device 35, a medium drive device 36, and a network connection device 37. They are interconnected through a bus 38.

The memory 32 comprises, for example, ROM (read only memory), RAM (random access memory), etc. and stores a program and data used in processes. The CPU 31 performs necessary processes by executing a program using the memory 32. The programs of the above mentioned iteration method for simultaneous linear equations and the preconditioning process are stored in a specific program code segment in the memory 32 as a set of instructions.

The input device 33 is, for example, a keyboard, a pointing device, a touch panel, etc., and is used in inputting an instruction and information from a user. The output device 34 is, for example, a display, a printer, a speaker, etc., and is used in outputting an inquiry and a process result to a user.

The external storage device 35 is, for example, a magnetic disk device, an optical disk device, a magneto-optical disk device, a tape recorder device, etc. The information processing device stores the above mentioned program and data in the external storage device 35, loads them to the memory 32 as necessary, and use them.

The medium drive device 36 drives a portable storage medium 39, and accesses the stored contents. The portable storage medium 39 can be any computer-readable storage medium such as a memory card, a floppy disk, CD-ROM (compact disk read only memory), an optical disk, a magneto-optical disk, etc. A user stores the above mentioned program and data in the portable storage medium 39, loads them to the memory 32 as necessary, and uses them.

The network connection device 37 is connected to any communications network such as a LAN (local area network), etc., and converts data for use in communications. In addition, the information processing device receives the above mentioned program and data from other devices such as a server, etc. through the network connection device 37, loads them to the memory 32 as necessary, and uses them.

FIG. 11 shows computer-readable storage media capable of providing a program and data for the information processing device shown in FIG. 10. The program and data stored in the portable storage medium 39 or in a database 41 of a server 40 are loaded to the memory 32. Then, the CPU 31 executes the program using the data, and performs a necessary process. At this time, the server 40 generates a propagation signal for propagating the program and the data, and transmits the signal to the information processing device through any transmission medium in the network.

According to the present invention, a preconditioning process can be performed with computation convergence accelerated in an iteration method for simultaneous linear equations in which a coefficient matrix is not an M-matrix. Therefore, a problem which cannot converge in a conventional preconditioning process can be efficiently solved.

What is claimed is:

1. A processing apparatus which performs a preconditioning process for an iteration method used to solve simultaneous linear equations through performing multilevel block incomplete factorization, comprising:

a coefficient storage unit storing a coefficient matrix at a certain level in the block incomplete factorization;

a determination unit determining a set of variable numbers of variables to be removed so that a block matrix comprising elements, which have the variable numbers of the variables to be removed as row numbers and column numbers, of the coefficient matrix stored in said coefficient storage unit can be diagonal dominant;

a set storage unit storing information about the determined set of variable numbers;

an inverse matrix unit obtaining an approximate inverse matrix of the block matrix according to the information stored in said set storage unit;

a coefficient matrix unit obtaining a coefficient matrix at a coarse level from a block matrix comprising elements, which have variable numbers of remaining variables as row numbers and column numbers, of the coefficient matrix stored in said coefficient storage unit;

a factorization unit storing the coefficient matrix at the coarse level in said coefficient storage unit to perform subsequent block incomplete factorization; and a computation unit computing a matrix-vector product in the iteration method using the approximate inverse matrix.

2. The apparatus according to claim 1, wherein said determination unit determines the set of the variable numbers by setting an initial value of a direct neighbor set which is a subset of a set of superscripts of the elements of the coefficient matrix stored in said coefficient storage unit, and obtaining a maximal independent set of superscripts using the initial value of the direct neighbor set and a random value.

3. The apparatus according to claim 1, wherein said inverse matrix unit obtains the approximate inverse matrix in iterative computation with given approximate precision.

4. The apparatus according to claim 1, wherein said coefficient matrix unit reduces non-zero elements in the coefficient matrix at the coarse level, and maintains sparsity of the coefficient matrix at the coarse level.

5. A parallel computer which has a plurality of processors and performs a preconditioning process for an iteration method used to solve simultaneous linear equations through multilevel block incomplete factorization, comprising:

a coefficient storage unit dividing and storing a coefficient matrix at a certain level in the block incomplete factorization so that the plurality of processors can perform a parallel process on the coefficient matrix;

a determination unit determining in parallel a set of variable numbers of variables to be removed so that a block matrix comprising elements, which have the variable numbers of the variables to be removed as row numbers and column numbers, of the coefficient matrix stored in said coefficient storage unit can be diagonal dominant;

a set storage unit dividing and storing information about the determined set of the variable numbers so that the plurality of processors can perform a parallel process on the information about the set of the variable numbers;

an inverse matrix unit obtaining in parallel an approximate inverse matrix of the block matrix according to the information stored in said set storage unit;

a coefficient matrix unit obtaining in parallel a coefficient matrix at a coarse level from a block matrix comprising elements, which have variable numbers of remaining variables as row numbers and column numbers, of the coefficient matrix stored in said coefficient storage unit;

a factorization unit dividing and storing the coefficient matrix at the coarse level in said coefficient storage unit to perform subsequent block incomplete factorization; and a computation unit computing in parallel a matrix-vector product in the iteration method using the approximate inverse matrix.

6. A computer-readable storage medium storing a program used to direct a computer to perform a preconditioning process for an iteration method used to solve simultaneous linear equations through multilevel block incomplete factorization, said preconditioning process comprising:

storing a coefficient matrix at a certain level in the block incomplete factorization;

determining a set of variable numbers of variables to be removed so that a block matrix comprising elements, which have the variable numbers of the variables to be removed as row numbers and column numbers, of the stored coefficient matrix can be diagonal dominant;

storing information about the determined set of the variable numbers;

obtaining an approximate inverse matrix of the block matrix according to the stored information;

obtaining a coefficient matrix at a coarse level from a block matrix comprising elements, which have variable numbers of remaining variables as row numbers and column numbers, of the stored coefficient matrix;

storing the coefficient matrix at the coarse level to perform subsequent block incomplete factorization; and computing a matrix-vector product in the iteration method using the approximate inverse matrix.

7. A propagation signal for propagating a program to a computer which performs a preconditioning process for an iteration method used to solve simultaneous linear equations through multilevel block incomplete factorization, said program directing the computer to perform:

storing a coefficient matrix at a certain level in the block incomplete factorization;

determining a set of variable numbers of variables to be removed so that a block matrix comprising elements, which have the variable numbers of the variables to be removed as row numbers and column numbers, of the stored coefficient matrix can be diagonal dominant;

storing information about the determined set of the variable numbers;

obtaining an approximate inverse matrix of the block matrix according to the stored information;

obtaining a coefficient matrix at a coarse level from a block matrix comprising elements, which have variable numbers of remaining variables as row numbers and column numbers, of the stored coefficient matrix;

storing the coefficient matrix at the coarse level to perform subsequent block incomplete factorization; and computing a matrix-vector product in the iteration method using the approximate inverse matrix.

8. A processing apparatus which performs a preconditioning process for an iteration method used to solve simultaneous linear equations through performing multilevel block incomplete factorization, comprising:

coefficient storage means for storing a coefficient matrix at a certain level in the block incomplete factorization;

determination means for determining a set of variable numbers of variables to be removed so that a block matrix comprising elements, which have the variable numbers of the variables to be removed as row numbers and column numbers, of the coefficient matrix stored in said coefficient storage means can be diagonal dominant;

set storage means for storing information about the determined set of variable numbers;

inverse matrix means for obtaining an approximate inverse matrix of the block matrix according to the information stored in said set storage means;

coefficient matrix means for obtaining a coefficient matrix at a coarse level from a block matrix comprising elements, which have variable numbers of remaining variables as row numbers and column numbers, of the coefficient matrix stored in said coefficient storage means;

factorization means for storing the coefficient matrix at the coarse level in said coefficient storage means to perform subsequent block incomplete factorization; and computation means for computing a matrix-vector product in the iteration method using the approximate inverse matrix.

* * * * *